April 26, 1955

T. A. HARRIS 2,707,021

LIQUID FUEL SUPPLY SYSTEMS

Filed March 29, 1952

2 Sheets-Sheet 1

Inventor
T. A. Harris

United States Patent Office 2,707,021
Patented Apr. 26, 1955

2,707,021
LIQUID FUEL SUPPLY SYSTEMS

Thomas Alfred Harris, Edgbaston, Birmingham, England, assignor to Joseph Lucas (Industries) Limited, Birmingham, England Application March 29, 1952, Serial No. 279,286

Claims priority, application Great Britain March 29, 1951

2 Claims. (Cl. 158—36.3)

This invention relates to liquid fuel supply systems for jet engines, gas turbines or the like of the kind in which the fuel is supplied to the combustion chamber through one or more burners of the swirl type, and in which provision is made for the return of excess fuel from the burner or burners to the system, the excess fuel being such as is required to maintain an effective swirl action in the burner or burners.

In the specification of Patent No. 2,519,658 there is described a system of the above mentioned kind, in which an injector (supplied by a pump) is used for circulating the excess fuel between the burner or burners and the system under idling or low load conditions, and in which the injector can be by-passed automatically under higher load conditions.

The present invention has for its object to provide improved means for controlling the action of the injector.

The invention comprises the combination with the injector, of a by-pass valve having associated with it a fuel-operated servo-mechanism for opening the valve, the servo-mechanism being responsive to a predetermined fuel pressure difference in appropriate parts of the system.

Figure 1:
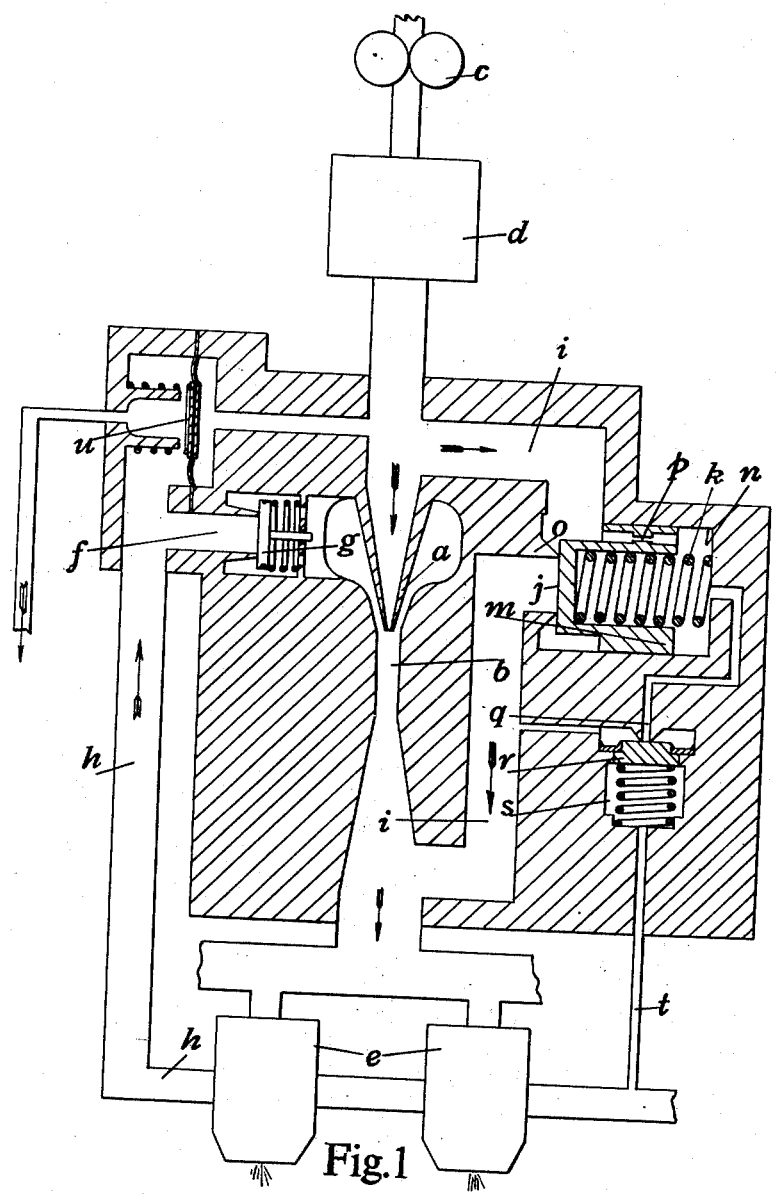
Figure 2:
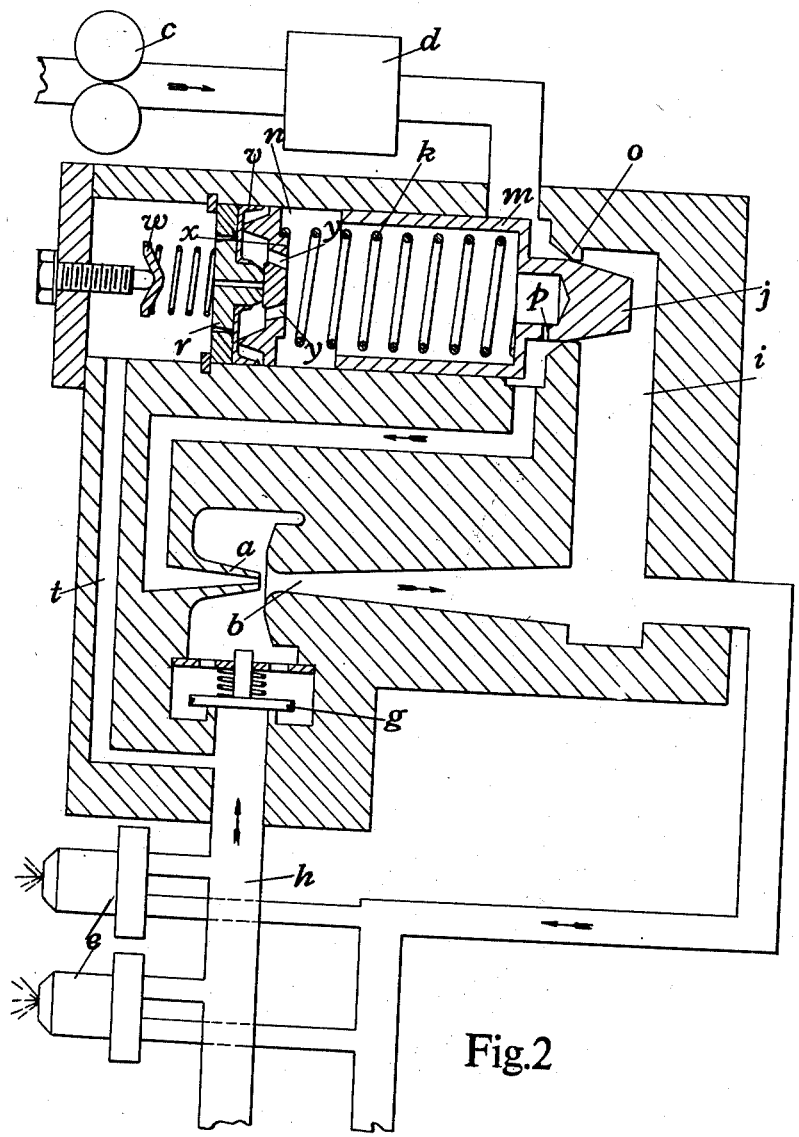

In the accompanying drawings:

Figures 1 and 2 are diagrams illustrating two embodiments of the invention.

Referring to Figure 1, an injector (comprising a nozzle $a$ and throat $b$) is supplied with liquid fuel from a pump $c$ at a variable rate, under the control of any appropriate means indicated by $d$. The fuel flowing from the injector is supplied to a burner $e$, or a plurality of burners $e$ arranged in parallel. The injector is provided with an excess fuel supply inlet $f$ which is controlled by a non-return valve $g$, and is connected to the swirl chamber or chambers of the burner or burners by way of a spill or excess flow pipe $h$.

The main fuel inlet and outlet ends of the injector are interconnected by a by-pass passage $i$ which is controlled by a valve $j$ loaded by a spring $k$ and adapted to be moved to its open position against the action of the spring by a fuel-operated servo-mechanism. In the form shown, the servo-mechanism is similar to that described in the specification of Patent No. 2,519,658 and comprises a hollow stepped piston $m$ slidable in a cylindrical chamber $n$, the closed and smaller end of the piston being adapted to co-operate with an annular seating $o$ in said passage and thereby serve as the required valve. The closed end of the piston is subject to the pressure of the fuel at the inlet side of the injector, and the ends of the cylinder are in communication with each other through a restricted orifice $p$. In communication with the other end of the cylinder is arranged a vent $q$ which is controlled by a valve $r$ carried by a spring loaded diaphragm (or piston) which divides another chamber $s$ into two compartments. One of these compartments is in communication with the by-pass passage at the discharge side of the seating of the servo-actuated valve (or with any other part between the injector and the burner or burners) and the other compartment is in communication with a passage $t$ leading from the pipe $h$ connected to the swirl chamber or chambers of the burner or burners.

The pipe $h$ leading to the injector is provided as shown with a normally open and spring loaded drain valve $u$, which is closed by the pressure of the liquid fuel at the entrance to the injector when the system is in operation and which opens automatically for emptying the contents of the pipe $h$ to a drain when the system is at rest.

The mode of action is as follows:

During idling or low-load conditions fuel is supplied by the pump to the burner or burners through the injector and the latter then serves to withdraw excess fuel from the swirl chamber or chambers and return it to the system. In this condition the fuel pressure difference between the discharge end of the injector and the burner chamber or chambers is relatively small and the servo-operated valve in the by-pass remains closed. But with increasing load this pressure difference increases, and when it reaches a predetermined amount the diaphragm (or piston) causes the servo-vent valve $r$ to open. The preponderating fuel pressure acting on the exposed end of the servo piston then moves this piston in the direction for opening the by-pass valve $j$, thereby short-circuiting the ejector. With a return to the previous idling or low-load condition the pressure difference falls, causing the vent valve and the by-pass to reclose and so bring the ejector again into action.

In the arrangement shown in Figure 2, the liquid pressure difference between the inlet side of the injector and the spill pipe is used to actuate the servo-piston $m$. The arrangement there-shown is essentially similar to that shown in Figure 1, but differs in the following particulars. The cylindrical chamber $n$ containing the servo-piston $m$ contains also the vent control valve $r$. This valve is carried by a flexible seating ring $v$ and is loaded by a spring which is supported at one end by an adjustable abutment $w$. Against the sealing ring $v$ is pressed by the spring $k$ a disc $x$ which at its centre forms a seating for the valve $r$, the disc $x$ being chamfered as shown and also being formed with perforations $y$ through which liquid can flow from the chamber $n$ and thence through an axial hole in the valve $r$. This valve is subject at one side to the pressure of the liquid fuel at the entrance of the injector, and at the other side to the pressure of the excess liquid fuel returned to the injector along the passage $t$. The mode of action is similar to that of the arrangement described with reference to Figure 1. If desired the excess flow pipe $h$ in the arrangement of Figure 2 may also be provided with a non-return drain valve similar to that indicated by $g$ in Figure 1.

The invention is not, however, restricted to the above described examples, as details of construction or arrangement may be varied to suit different requirements.

Having thus described my invention what I claim as new and desire to secure by Letters Patent is:

1. A fuel supply system for a prime mover of the kind having at least one burner provided with a swirl chamber, comprising in combination with the burner, a liquid fuel pump, an injector situated between the pump and the burner so that liquid fuel delivered by the pump has access to the burner through the injector, a by-pass passage communicating at opposite ends respectively with the entrance and exit sides of the injector for conducting liquid fuel to the burner independently of the injector, a valve controlling fuel flow through the by-pass passage, a spill passage communicating with the swirl chamber of the burner and forming with the part of the supply system between the injector and burner a circulatory path through which excess liquid fuel supplied to the burner is circulated by the action of the injector when the by-pass valve is closed, a fuel-operated servo-mechanism operatively associated with the valve and provided with a control device responsive to liquid pressure and means for exposing the control device of the servo-mechanism to the opposing effects of the fuel pressures at one side of the injector and in the spill passage to cause opening of the valve by the servo-mechanism when the difference between the said fuel pressures attains a predetermined value.

2. A fuel supply system as claimed in claim 1, and having an automatic non-return valve controlling communication between the spill passage and the injector.

References Cited in the file of this patent

UNITED STATES PATENTS

| | | |
|---|---|---|
| 2,519,658 | Ifield | Aug. 22, 1950 |
| 2,559,938 | Carey | July 10, 1951 |
| 2,566,734 | Lawrence et al. | Sept. 4, 1951 |